US012217921B2

(12) United States Patent
Tomizawa et al.

(10) Patent No.: US 12,217,921 B2
(45) Date of Patent: Feb. 4, 2025

(54) VACUUM CIRCUIT BREAKER

(71) Applicant: Mitsubishi Electric Corporation, Tokyo (JP)

(72) Inventors: Yusuke Tomizawa, Tokyo (JP); Takuma Sasai, Tokyo (JP); Masao Akiyoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 175 days.

(21) Appl. No.: 17/918,576

(22) PCT Filed: May 20, 2020

(86) PCT No.: PCT/JP2020/019994
§ 371 (c)(1),
(2) Date: Oct. 13, 2022

(87) PCT Pub. No.: WO2021/234870
PCT Pub. Date: Nov. 25, 2021

(65) Prior Publication Data
US 2023/0145798 A1 May 11, 2023

(51) Int. Cl.
*H01H 33/662* (2006.01)
*H01H 33/664* (2006.01)
*H01H 33/666* (2006.01)

(52) U.S. Cl.
CPC .... *H01H 33/66238* (2013.01); *H01H 33/664* (2013.01); *H01H 33/666* (2013.01)

(58) Field of Classification Search
CPC .......... H01H 33/66238; H01H 33/664; H01H 33/666; H01H 2033/66246
(Continued)

(56) References Cited

U.S. PATENT DOCUMENTS 2,979,587 A * 4/1961 Jennings .......... H01H 33/66238 218/135
4,585,913 A 4/1986 Yorita
(Continued)

FOREIGN PATENT DOCUMENTS

JP 52-168257 U 12/1977
JP 53-21359 U 2/1978
(Continued)

OTHER PUBLICATIONS

Extended European Search Report issued Jun. 26, 2023 in corresponding European Patent Application No. 20936554.3, 8 pages.
(Continued)

*Primary Examiner* — William A Bolton
(74) *Attorney, Agent, or Firm* — XSENSUS LLP

(57) ABSTRACT

A coupling bellows includes a first bellows and a second bellows having a higher spring constant than the first bellows. A coupling member is joined to each of the first bellows and the second bellows adjacent to each other, and includes a hole inserted with a movable shaft. A pressing member moves in an axial direction of the movable shaft toward the coupling member along with movement of the movable shaft in the direction in which a movable contactor is separated from a fixed contactor, and presses the coupling member, thereby contracting the second bellows.

15 Claims, 14 Drawing Sheets

(58) Field of Classification Search
USPC .................................................. 218/118, 135
See application file for complete search history.

(56) References Cited

U.S. PATENT DOCUMENTS

| | | | | |
|---|---|---|---|---|
| 8,575,509 | B2 * | 11/2013 | Marchand | H01H 33/664 218/126 |
| 2004/0061504 | A1 | 4/2004 | Krafft et al. | |
| 2013/0001200 | A1 * | 1/2013 | Morita | H01H 33/66238 218/135 |
| 2017/0167475 | A1 * | 6/2017 | Mori | F04B 45/024 |

FOREIGN PATENT DOCUMENTS

| | | | |
|---|---|---|---|
| JP | 53-39258 | U | 4/1978 |
| JP | 58-71522 | A | 4/1983 |
| JP | 60-65955 | A | 4/1985 |
| JP | H05-174677 | A | 7/1993 |
| JP | 2004-517455 | A | 6/2004 |

OTHER PUBLICATIONS

International Search Report and Written Opinion mailed on Aug. 18, 2020, received for PCT Application PCT/JP2020/019994, filed on May 20, 2020, 10 pages including English Translation.

* cited by examiner

VACUUM CIRCUIT BREAKER

CROSS-REFERENCE TO RELATED APPLICATION

The present application is based on PCT filing PCT/JP2020/019994, filed May 20, 2020, the entire contents of which are incorporated herein by reference.

TECHNICAL FIELD

The present disclosure relates to a vacuum circuit breaker.

BACKGROUND ART

Utility Model Laying-Open No. 53-39258 (PTL 1) is a prior document that discloses a configuration of the vacuum circuit breaker. The vacuum circuit breaker described in PTL 1 includes an insulating container, a movable shaft, a bellows, a disk member, a guide member, and a shrinkage preventing member. The disk member is provided at a joint between the two bellows.

CITATION LIST

Patent Literature

PTL 1: Utility Model Laying-Open No. 53-039258

SUMMARY OF INVENTION

Technical Problem

In the vacuum circuit breaker described in PTL 1, when the movable shaft is braked during an interruption process, an amplitude of an axial vibration caused by resonance of the bellows increases from a start of the braking until a stop of the movable shaft, and a fatigue life of the bellows is shortened.

The present disclosure has been made in view of the above problems, and an object of the present disclosure is to provide a vacuum circuit breaker that can reduce the amplitude of the axial vibration of the bellows to prolong the fatigue life of the bellows.

Solution to Problem

A vacuum circuit breaker according to the present disclosure includes a fixed contactor, a movable contactor, a container, a movable shaft, a plate-shaped member, a coupling bellows, a coupling member, and a pressing member. The movable contactor can be contactable with and separable from the fixed contactor. The container accommodates each of the fixed contactor and the movable contactor and holds the inside in vacuum. The movable shaft extends in the axial direction from the outside of the container, is connected to the movable contactor, and moves in the axial direction to drive the movable contactor. The plate-shaped member is attached to the movable shaft inside the container and extends around the axis of the movable shaft. The coupling bellows includes a first bellows that is expandable and contractible in the axial direction and a second bellows, which is positioned side by side with the first bellows in the axial direction and is expandable and contractible in the axial direction and has a spring constant higher than that of the first bellows, and airtightly connects the plate-shaped member and the inner surface of the container outside the movable shaft. The coupling member includes a hole, which extends in the radial direction of the movable shaft so as to protrude to at least one of the inner peripheral side and the outer peripheral side of each of the first bellows and the second bellows, is joined to each of the first bellows and the second bellows adjacent to each other, and is inserted with the movable shaft so as to be movable in the axial direction. The pressing member is disposed on the inner peripheral side or the outer peripheral side of the first bellows, and moves in the axial direction toward the coupling member along with movement of the movable shaft in a direction in which the movable contactor is separated from the fixed contactor to press the coupling member, thereby contracting the second bellows.

Advantageous Effects of Invention

According to the present disclosure, because the second bellows has the spring constant higher than that of the first bellows, the natural frequencies of the first bellows and the second bellows can be made different from each other to prevent generation of resonance in the coupling bellows, so that the amplitude of the axial vibration of the coupling bellows can be decreased to lengthen the fatigue life of the coupling bellows.

DESCRIPTION OF EMBODIMENTS

Figure 1:
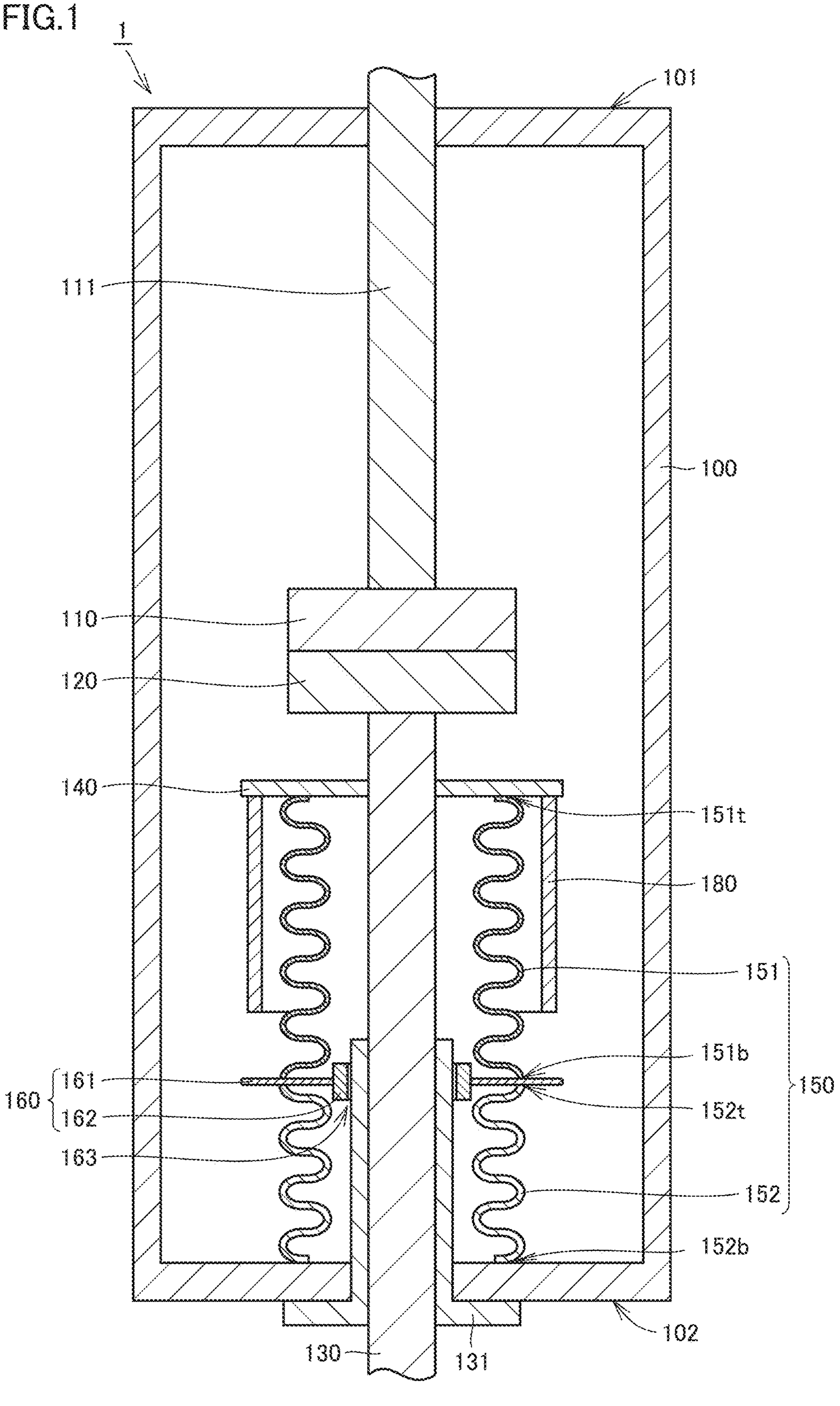
FIG. 1 is a longitudinal sectional view illustrating a configuration of a vacuum circuit breaker according to a first embodiment.

Hereinafter, a vacuum circuit breaker according to each embodiment of the present invention will be described with reference to the drawings. In the following description of the embodiments, the same or corresponding portions in the drawings are denoted the same reference numeral, and the description will not be repeated.

First Embodiment

Figure 2:
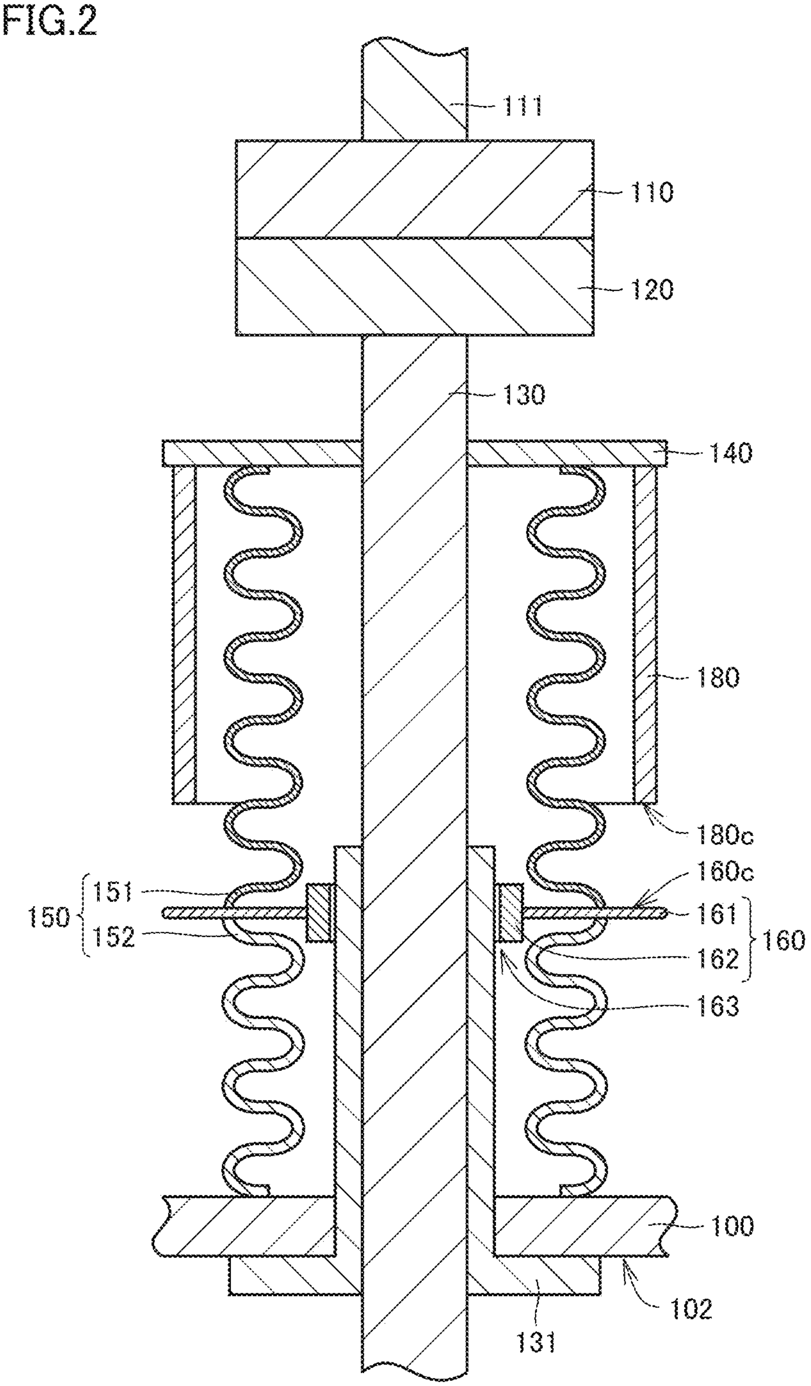
FIG. 2 is an enlarged longitudinal sectional view illustrating a periphery of a coupling bellows when the vacuum circuit breaker of the first embodiment is closed.

FIG. 1 is a longitudinal sectional view illustrating a configuration of a vacuum circuit breaker according to a first embodiment. FIG. 2 is an enlarged longitudinal sectional view illustrating a periphery of a coupling bellows when the vacuum circuit breaker of the first embodiment is closed.

As illustrated in FIGS. 1 and 2, a vacuum circuit breaker 1 of the first embodiment includes a fixed contactor 110, a movable contactor 120, a container 100, a movable shaft 130, a plate-shaped member 140, a coupling bellows 150, a coupling member 160, and a pressing member 180. Vacuum circuit breaker 1 of the first embodiment further includes a fixed shaft 111 and a guide member 131.

Fixed contactor 110 is joined to a tip of fixed shaft 111 in the axial direction. Movable contactor 120 is disposed opposite to fixed contactor 110 so as to be contactable with and separable from fixed contactor 110. When vacuum circuit breaker 1 is closed, movable contactor 120 comes into contact with fixed contactor 110 to be in an energized state.

Container 100 accommodates each of fixed contactor 110 and movable contactor 120 and holds the inside of container 100 in a vacuum. Container 100 has a top surface 101 at an upper portion and a bottom surface 102 at a lower portion. Fixed shaft 111 is fixed to top surface 101.

Movable shaft 130 extends in the axial direction of movable shaft 130 from the outside of container 100 and is connected to movable contactor 120. Movable shaft 130 is inserted into a cylindrical guide member 131 penetrating bottom surface 102. An outer peripheral surface of movable shaft 130 is in sliding contact with an inner peripheral surface of guide member 131. Movable shaft 130 passes through the inside of guide member 131 and is connected to a spring type or electromagnetic type drive mechanism (not illustrated) outside container 100.

Movable shaft 130 moves in the axial direction of movable shaft 130 to drive movable contactor 120. When the drive mechanism operates, movable shaft 130 moves toward a side opposite to a side of fixed contactor 110 in the axial direction of movable shaft 130 while being in sliding contact with guide member 131. Thus, when movable contactor 120 is separated from fixed contactor 110, vacuum circuit breaker 1 is opened, and energization is cut off between fixed contactor 110 and movable contactor 120.

Plate-shaped member 140 is attached to movable shaft 130 in container 100. Plate-shaped member 140 extends around the axis of movable shaft 130. Desirably plate-shaped member 140 is attached to movable shaft 130 so as to extend in a direction orthogonal to the axial direction of movable shaft 130. In the first embodiment, plate-shaped member 140 has a disk-shaped outer shape.

Coupling bellows 150 airtightly connects plate-shaped member 140 and an inner surface of container 100 outside movable shaft 130. Thus, an internal space of container 100 outside coupling bellows 150 is airtightly held. Coupling bellows 150 includes a first bellows 151 and a second bellows 152.

First bellows 151 can expand and contract in the axial direction of movable shaft 130. An upper end 151*t* of first bellows 151 is connected to plate-shaped member 140. Upper end 151*t* of first bellows 151 and plate-shaped member 140 are joined to each other by, for example, welding or brazing.

Second bellows 152 is positioned side by side with first bellows 151 in the axial direction of movable shaft 130, and can expand and contract in the axial direction of movable shaft 130 while having a spring constant higher than that of first bellows 151. A lower end 152*b* of second bellows 152 is connected to bottom surface 102 of container 100. Lower end 152*b* of second bellows 152 and bottom surface 102 of container 100 are joined to each other by, for example, welding or brazing.

Each of first bellows 151 and second bellows 152 has a crest and a valley alternately arranged in the axial direction of movable shaft 130. Each of first bellows 151 and second bellows 152 contracts when adjacent crests and valleys approach each other with axial movement of movable shaft 130, and extends when the adjacent crests and valleys are separated from each other. The numbers of crests and valleys of each of first bellows 151 and second bellows 152 may be provided in the number of range that can withstand the expansion and contraction due to the axial movement of movable shaft 130.

The difference between a spring constant of first bellows 151 and a spring constant of second bellows 152 can be caused by a difference in at least one of a film thickness, a difference between an inner diameter and an outer diameter, the number of crests, and a material of each of first bellows 151 and second bellows 152.

When vacuum circuit breaker 1 is for a high voltage, in order to ensure required withstand voltage performance, the distance between contacts between fixed contactor 110 and movable contactor 120 when vacuum circuit breaker 1 is opened is, for example, greater than or equal to 50 mm and less than or equal to 100 mm. A length of coupling bellows 150 in the axial direction of movable shaft 130 is determined corresponding to displacement of an inter-contact distance between fixed contactor 110 and movable contactor 120 when vacuum circuit breaker 1 is opened.

When a general vacuum circuit breaker is opened and closed at a high speed, an impact displacement load close to an impulse input acts on the bellows at the moment when the movable shaft starts to move, and axial vibration is generated. The axial vibration is generated by resonance of the bellows, and is vibration having the same frequency as the natural frequency of the bellows. Due to the axial vibration, a larger load is repeatedly generated than when static displacement load acts on the bellows, so that the fatigue life of the bellows is reduced. Because the fatigue life of the bellows becomes the life of the vacuum circuit breaker, the extension of the fatigue life of the bellows is an important issue. Therefore, vacuum circuit breaker 1 of the first embodiment includes coupling bellows 150 having the above configuration.

As illustrated in FIGS. 1 and 2, coupling member 160 includes a coupling unit 161 extending in a radial direction of movable shaft 130 so as to project to at least one of an inner peripheral side and an outer peripheral side of each of first bellows 151 and second bellows 152. Coupling unit 161 is joined to each of first bellows 151 and second bellows 152 adjacent to each other. In the first embodiment, coupling unit 161 extends in the radial direction of movable shaft 130 so as to project to both the inner peripheral side and the outer peripheral side of each of first bellows 151 and second bellows 152. Coupling unit 161 has an annular shape.

As illustrated in FIG. 1, first bellows 151 is located above coupling unit 161, and second bellows 152 is located below coupling unit 161. Coupling unit 161 is joined to each of a lower end 151*b* of first bellows 151 and an upper end 152*t* of second bellows 152. Coupling unit 161 is joined to each of lower end 151*b* and upper end 152*t* by, for example, welding or brazing.

As illustrated in FIG. 2, coupling member 160 includes a first surface 160*c* that comes into contact with pressing member 180. In the first embodiment, first surface 160*c* is an upper surface of coupling unit 161. Lower end 151*b* of first bellows 151 is connected to first surface 160*c*.

Coupling member 160 includes a hole 163 inserted with movable shaft 130 so as to be movable in the axial direction of movable shaft 130. In the first embodiment, coupling member 160 includes an annular sliding contact unit 162 that comes into sliding contact with the outer peripheral surface of guide member 131 in order to prevent coupling bellows 150 from buckling due to pressure inside coupling bellows 150. A hole 163 is located inside sliding contact unit 162. Coupling unit 161 is connected to the outer peripheral surface of sliding contact unit 162.

Pressing member 180 is disposed on the inner peripheral side or the outer peripheral side of first bellows 151. In the first embodiment, pressing member 180 is disposed on the outer peripheral side of first bellows 151. Pressing member 180 extends downward from the lower surface of plate-shaped member 140. An upper end of pressing member 180 is connected to plate-shaped member 140. Pressing member 180 is located above coupling unit 161.

Pressing member 180 includes a second surface 180*c* that comes into contact with coupling member 160. In the first embodiment, second surface 180*c* is a lower surface of pressing member 180. Second surface 180*c* of pressing member 180 comes into contact coupling unit 161.

Pressing member 180 has a cylindrical shape, but the shape of pressing member 180 is not limited to the cylindrical shape, and may be any shape as long as the pressing member 180 comes into contact with coupling unit 161 and can move coupling member 160 in the axial direction of movable shaft 130. For example, second surface 180*c* of pressing member 180 may be discontinuous in a circumferential direction of movable shaft 130.

Vacuum circuit breaker 1 of the first embodiment brakes movable shaft 130 during an interruption process in order to secure the time to extend and extinguish an arc generated during the opening. Movable shaft 130 starts the braking after movable contactor 120 is separated from fixed contactor 110 by the start of the movement of movable shaft 130, and a moving speed in the axial direction of movable shaft 130 decreases. Specifically, movable shaft 130 is braked by a braking mechanism (not illustrated) after movable contactor 120 is separated from fixed contactor 110 until the opening of vacuum circuit breaker 1 is completed. At the start of the braking, the input load having a phase opposite to the input load at the moment when movable shaft 130 starts to move acts on coupling bellows 150.

Figure 3:
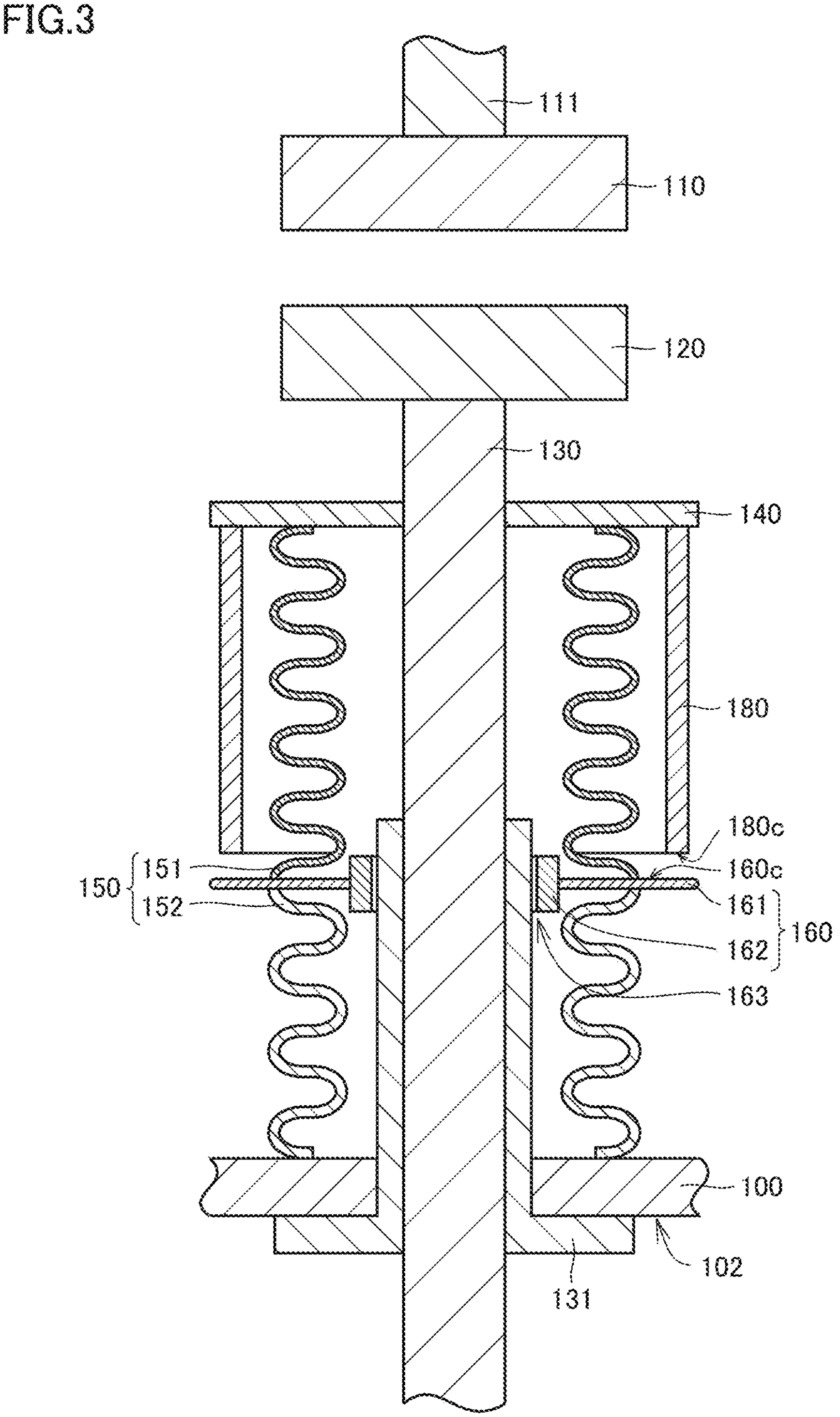
FIG. 3 is an enlarged longitudinal sectional view illustrating the periphery of the coupling bellows before a pressing member presses a coupling member in a middle of opening of the vacuum circuit breaker according to the first embodiment.
Figure 4:
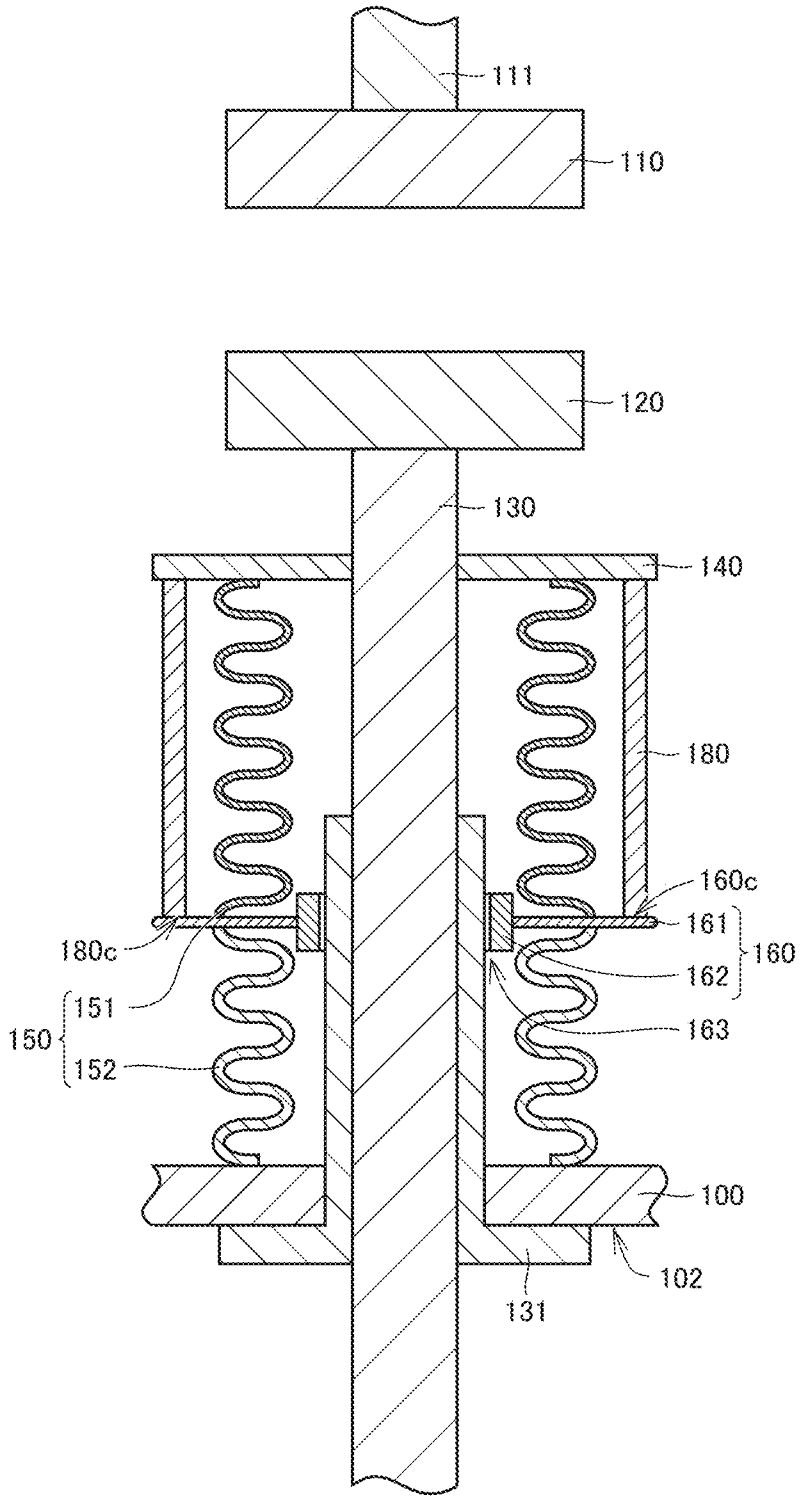
FIG. 4 is an enlarged longitudinal sectional view illustrating the periphery of the coupling bellows while the opening of the vacuum circuit breaker of the first embodiment is completed.

FIG. 3 is an enlarged longitudinal sectional view illustrating the periphery of the coupling bellows before the pressing member presses the coupling member in a middle of the opening of the vacuum circuit breaker according to the first embodiment. FIG. 4 is an enlarged longitudinal sectional view illustrating the periphery of the coupling bellows while the opening of the vacuum circuit breaker of the first embodiment is completed.

As illustrated in FIGS. 3 and 4, pressing member 180 moves in the axial direction of movable shaft 130 toward coupling member 160 along with the movement of movable shaft 130 in the direction in which movable contactor 120 is separated from fixed contactor 110 to press coupling member 160, thereby contracting second bellows 152.

Because second bellows 152 has the spring constant larger than that of first bellows 151, first bellows 151 more easily expands and contracts in the axial direction of movable shaft 130 than second bellows 152. Accordingly, first bellows 151 preferentially contracts from the start of the opening of vacuum circuit breaker 1 until pressing member 180 and coupling member 160 come into contact with each other. When first bellows 151 contracts and second surface 180*c* of pressing member 180 comes into contact with first surface 160*c* of coupling member 160, the contraction of first bellows 151 stops. After pressing member 180 and coupling member 160 come into contact with each other, only second bellows 152 contracts until the opening of vacuum circuit breaker 1 is completed.

In vacuum circuit breaker 1 of the first embodiment, because second bellows 152 has the spring constant higher than that of first bellows 151, the natural frequencies of first bellows 151 and second bellows 152 can be made different from each other to prevent the generation of the resonance in coupling bellows 150. For this reason, even when movable shaft 130 is braked during the interruption process, the amplitude of the axial vibration of coupling bellows 150 can be decreased to prolong the fatigue life of coupling bellows 150.

In addition, in vacuum circuit breaker 1 of the first embodiment, first bellows 151 preferentially contracts from the start of the opening of vacuum circuit breaker 1 until pressing member 180 and coupling member 160 come into contact with each other, and only second bellows 152 contracts until the opening of vacuum circuit breaker 1 is completed after pressing member 180 and coupling member 160 come into contact with each other, so that the load generated in each of first bellows 151 and second bellows 152 can be made uniform.

As described above, when the load distribution in coupling bellows 150 is uniformized while the amplitude of the axial vibration of coupling bellows 150 is decreased, the maximum load of coupling bellows 150 can be decreased to lengthen the fatigue life of coupling bellows 150.

Second Embodiment

A vacuum circuit breaker according to a second embodiment will be described below. The vacuum circuit breaker of the second embodiment is different from vacuum circuit breaker 1 of the first embodiment only in the configurations of the coupling member and the pressing member, and thus the description of other configurations will not be repeated.

Figure 5:
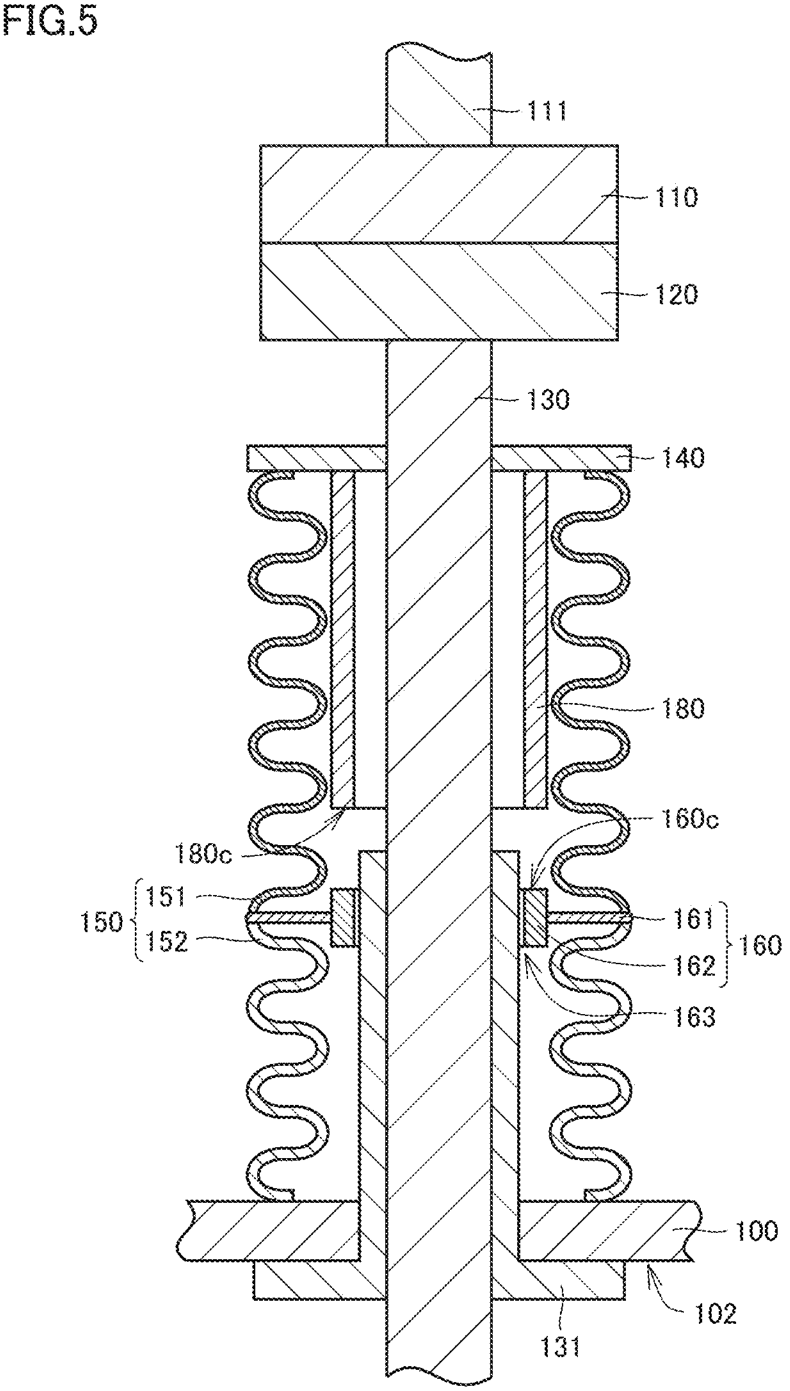
FIG. 5 is a longitudinal sectional view illustrating a configuration of a vacuum circuit breaker according to a second embodiment.

FIG. 5 is a longitudinal sectional view illustrating the configuration of the vacuum circuit breaker of the second embodiment. As illustrated in FIG. 5, in the vacuum circuit breaker of the second embodiment, coupling unit 161 extends in the radial direction of movable shaft 130 so as to protrude only to the inner peripheral side of each of first bellows 151 and second bellows 152. In the second embodiment, first surface 160*c* is an upper surface of sliding contact unit 162.

Pressing member 180 is disposed on the inner peripheral side of first bellows 151. The inner diameter of the pressing member 180 is larger than the outer diameter of guide member 131. In the second embodiment, second surface 180*c* of pressing member 180 comes into contact with sliding contact unit 162.

In the vacuum circuit breaker of the second embodiment, coupling member 160 extends in the radial direction of movable shaft 130 so as to protrude only to the inner peripheral side of each of first bellows 151 and second bellows 152, so that volume of coupling member 160 can be decreased as compared with vacuum circuit breaker 1 of the first embodiment. Thus, mass of coupling member 160 is decreased, so that the natural frequency of coupling bellows 150 connected to coupling member 160 can be increased. By increasing the natural frequency of coupling bellows 150, the amplitude of the axial vibration of coupling bellows 150 can be decreased to lengthen the fatigue life of coupling bellows 150.

Third Embodiment

A vacuum circuit breaker according to a third embodiment will be described below. The vacuum circuit breaker of the third embodiment is different from vacuum circuit breaker 1 of the first embodiment only in the configurations of the coupling bellows and the pressing member, and thus the description of other configurations will not be repeated.

Figure 6:
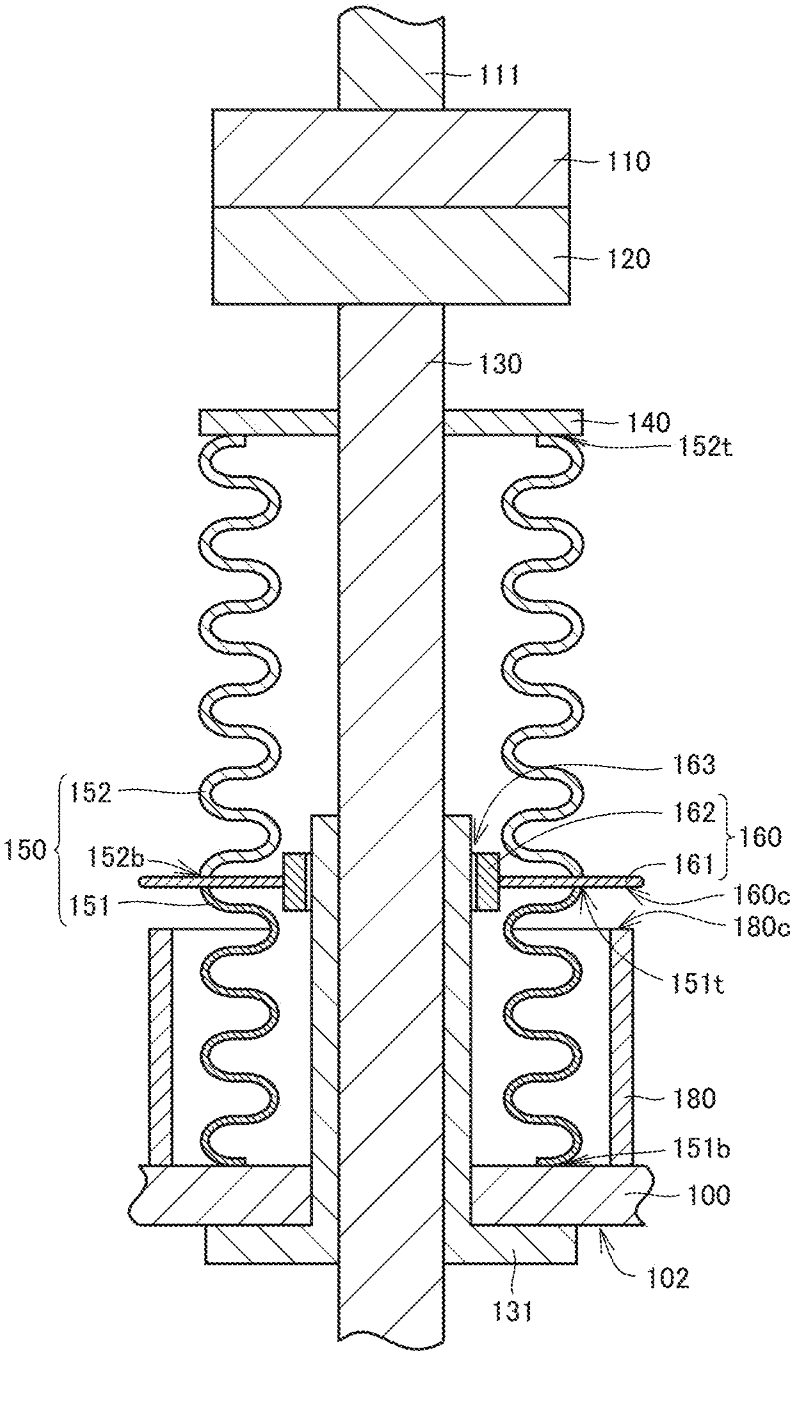
FIG. 6 is a longitudinal sectional view illustrating a configuration of a vacuum circuit breaker according to a third embodiment.

FIG. 6 is a longitudinal sectional view illustrating the configuration of the vacuum circuit breaker of the third embodiment. As illustrated in FIG. 6, in the vacuum circuit breaker of the third embodiment, second bellows 152 is located above coupling unit 161, and first bellows 151 is located below coupling unit 161. Coupling unit 161 is joined to each of upper end 151*t* of first bellows 151 and lower end 152*b* of second bellows 152. In the third embodiment, first surface 160*c* is a lower surface of coupling unit 161. Upper end 151*t* of first bellows 151 is connected to first surface 160*c*. Upper end 152*t* of second bellows 152 is connected to plate-shaped member 140, and lower end 151*b* of first bellows 151 is connected to bottom surface 102 of container 100.

Pressing member 180 is disposed on the outer diameter side of coupling bellows 150. Pressing member 180 extends upward from the upper surface of bottom surface 102. A lower end of pressing member 180 is connected to bottom surface 102. Pressing member 180 is located below coupling unit 161.

First bellows 151 preferentially contracts from the start of the opening of the vacuum circuit breaker of the third embodiment to the contact between pressing member 180 and coupling member 160. When first bellows 151 contracts and second surface 180*c* of pressing member 180 comes into contact with first surface 160*c* of coupling member 160, the contraction of first bellows 151 stops. After pressing member 180 and coupling member 160 come into contact with each other, only second bellows 152 contracts until the opening of vacuum circuit breaker 1 is completed.

Also in the vacuum circuit breaker of the third embodiment, by making the load distribution in coupling bellows 150 uniform while the amplitude of the axial vibration of coupling bellows 150 is decreased, the maximum load of coupling bellows 150 can be decreased to lengthen the fatigue life of coupling bellows 150.

Fourth Embodiment

A vacuum circuit breaker according to a fourth embodiment will be described below. The vacuum circuit breaker of the fourth embodiment is different from the vacuum circuit breaker of the second embodiment only in the timing when the plate-shaped member and the coupling member come into contact with each other, and thus the description of other configurations will not be repeated.

Figure 7:
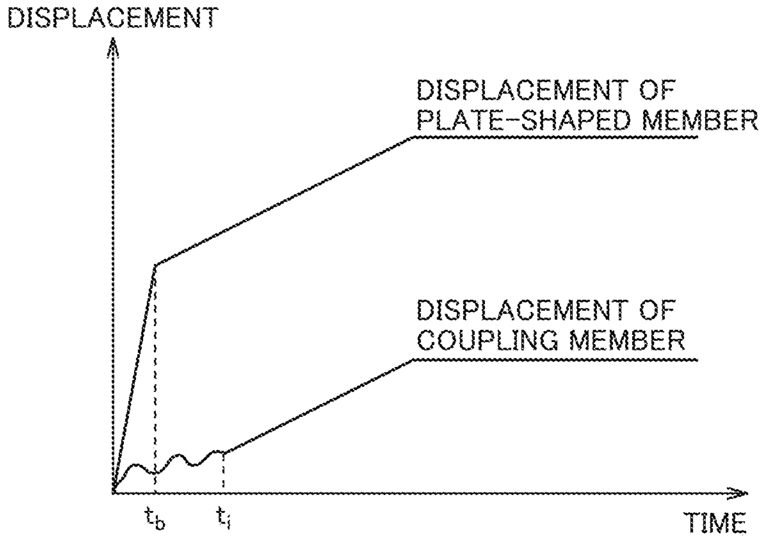
FIG. 7 is a graph illustrating a relationship between time from a start of opening and axial displacement of a movable shaft of each of a plate-shaped member and the coupling member in a vacuum circuit breaker according to a fourth embodiment.

FIG. 7 is a graph illustrating a relationship between time from the start of the opening and axial displacement of the movable shaft of each of the plate-shaped member and the coupling member in the vacuum circuit breaker of the fourth embodiment. In FIG. 7, a vertical axis represents the displacement, and a horizontal axis represents the time.

The time from the start of the movement of movable shaft 130 to the start of pressing force of pressing member 180 against coupling member 160 is defined as a first elapsed time $t_i$. The time from the start of the movement of movable shaft 130 to the start of the braking is defined as a second elapsed time $t_b$.

As illustrated in FIG. 7, movable shaft 130 starts the braking to decrease the moving speed in the axial direction of movable shaft 130 after movable contactor 120 is separated from fixed contactor 110 by the start of the movement of movable shaft 130. That is, the inclination indicating the change in displacement per unit time of plate-shaped member 140 fluctuates before and after second elapsed time $t_b$ elapses, and after the start of braking, the inclination is gentler than before the start of braking.

When first elapsed time $t_i$ is shorter than second elapsed time $t_b$, due to the large impact due to the collision between pressing member 180 and coupling member 160, coupling member 160 may vibrate greatly in the vertical direction, and the maximum displacement of coupling bellows 150 may increase.

In the vacuum circuit breaker of the fourth embodiment, because first elapsed time $t_i$ is longer than second elapsed time $t_b$, braked and decelerated pressing member 180 collides with coupling member 160, so that the impact caused by the collision between pressing member 180 and coupling member 160 can be reduced. As a result, the maximum load of coupling bellows 150 can be decreased to lengthen the fatigue life of coupling bellows 150.

Fifth Embodiment

A vacuum circuit breaker according to a fifth embodiment will be described below. The vacuum circuit breaker of the fifth embodiment is mainly different from the vacuum circuit breaker of the second embodiment in the positional relationship between the pressing member and the coupling member, and thus the description of other configurations will not be repeated.

Figure 8:
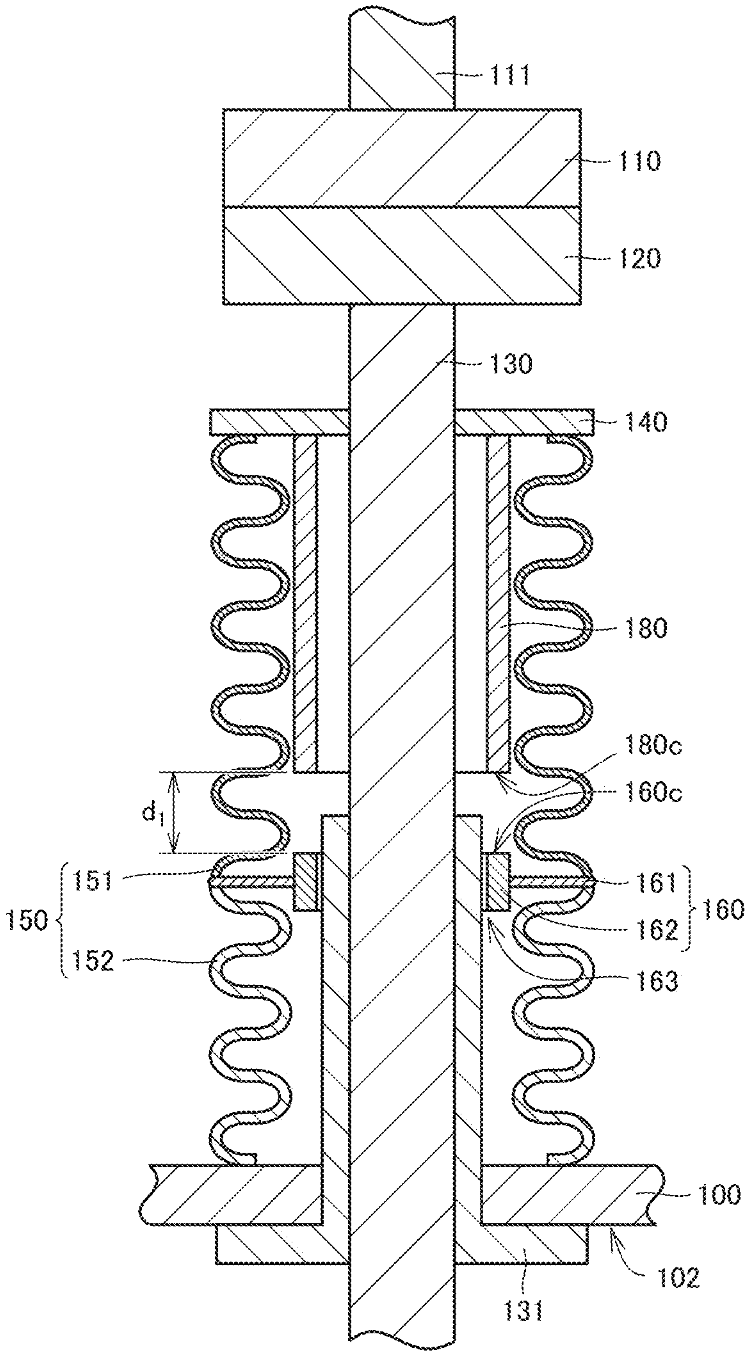
FIG. 8 is a longitudinal sectional view illustrating a distance between a first surface and a second surface during closing in a vacuum circuit breaker according to a fifth embodiment.
Figure 9:
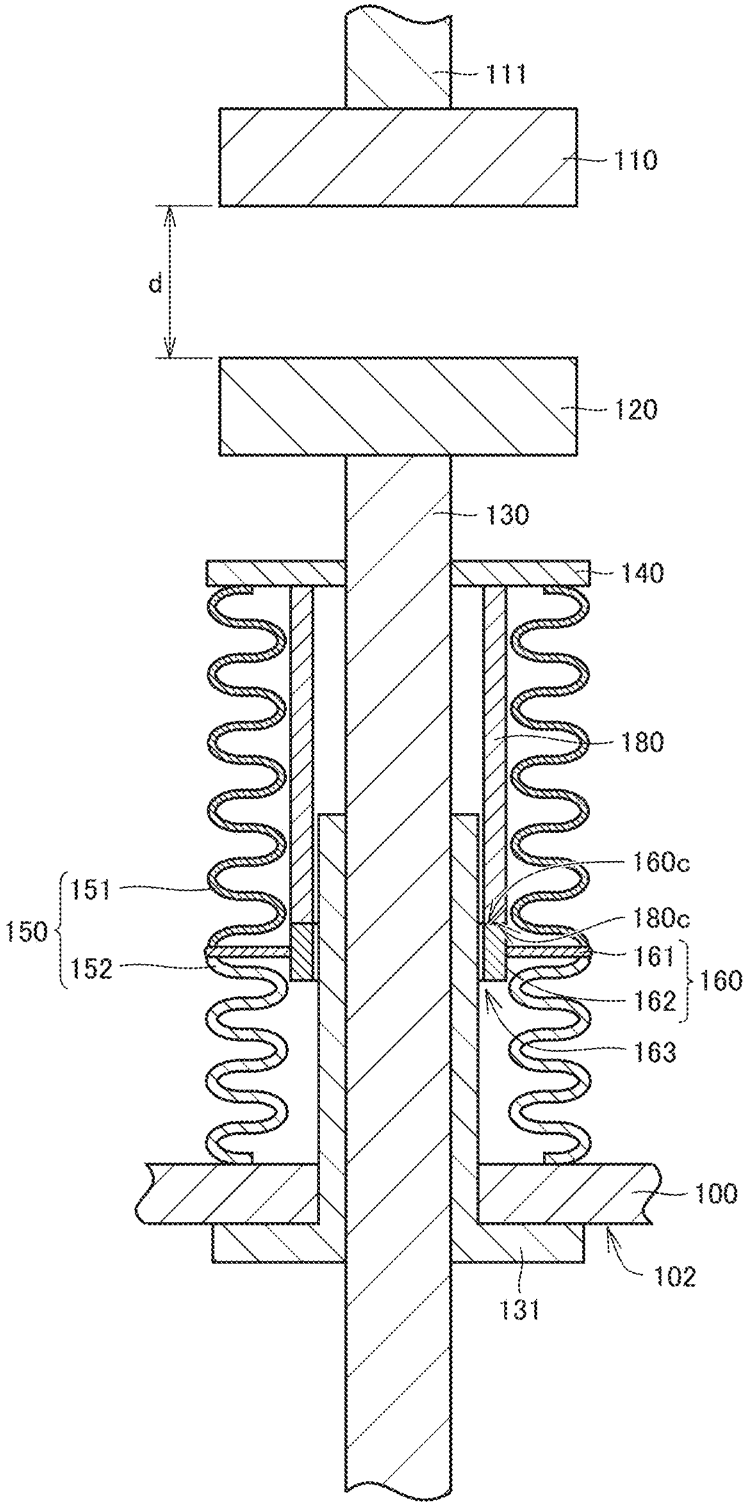
FIG. 9 is a longitudinal sectional view illustrating an opening stroke that is a distance between a fixed contactor and a movable contactor when opening is completed in the vacuum circuit breaker of the fifth embodiment.

FIG. 8 is a longitudinal sectional view illustrating the distance between the first surface and the second surface during the closing in the vacuum circuit breaker of the fifth embodiment. FIG. 9 is a longitudinal sectional view illustrating an opening stroke that is the distance between the fixed contactor and the movable contactor when the opening is completed in the vacuum circuit breaker of the fifth embodiment.

As illustrated in FIGS. 8 and 9, in the vacuum circuit breaker of the fifth embodiment, when a distance $d_1$ between pressing member 180 and coupling member 160 during the closing of the vacuum circuit breaker and an opening stroke d during the completion of the opening of the vacuum circuit breaker are used, the displacement amount of first bellows 151 in the axial direction of movable shaft 130 is $d_1$, and the displacement amount of second bellows 152 is $(d-d_1)$.

When the number of crests of first bellows 151 is set to $n_1$ and the number of crests of second bellows 152 is set to $n_2$, a deformation amount per pitch between the crest of first bellows 151 in the axial direction of movable shaft 130 during the opening and the closing of the vacuum circuit breaker is $d_1/n_1$, and a deformation amount per pitch between the crests of second bellows 152 is $(d-d_1)/n_2$.

In the fifth embodiment, because the spring constant of second bellows 152 is larger than the spring constant of first bellows 151, the load acting on second bellows 152 is larger than the load acting on first bellows 151 when the deformation amount per pitch is equal between the crests of first bellows 151 and second bellows 152. In order to decrease the difference in the load acting on each of first bellows 151 and second bellows 152, the deformation amount per pitch between the crests of second bellows 152 needs to be smaller than that of first bellows 151.

Accordingly, in the vacuum circuit breaker of the fifth embodiment, the deformation amount in the axial direction per pitch between the crests adjacent to each other in the axial direction of movable shaft 130 is smaller in second bellows 152 than in first bellows 151. Specifically, opening stroke d, distance $d_1$, the number $n_1$ of the crests of the first bellows 151, and the number $n_2$ of the crests of the second bellows 152 are set so as to satisfy a relationship of $d_1>n_1d/(n_1+n_2)$ as a condition that the deformation amount per pitch between the crests in the axial direction of movable shaft 130 is smaller in second bellows 152 than in first bellows 151.

However, when the spring constant of second bellows 152 is made larger than the spring constant of first bellows 151 by decreasing the number of crests of second bellows 152, a relationship of $d_1=n_1d/(n_1+n_2)$ may be satisfied. Thus, the spring constant of second bellows 152 can be made larger than the spring constant of first bellows 151 while the loads acting on first bellows 151 and second bellows 152 are equal to each other.

In the vacuum circuit breaker of the fifth embodiment, because the axial amount deformation per pitch between the peak portions adjacent to each other in the axial direction of movable shaft 130 is smaller in second bellows 152 than in first bellows 151, the maximum load acting on second bellows 152 can be prevented from becoming excessively large as compared with the maximum load acting on first bellows 151, so that second bellows 152 can be prevented from being subjected to fatigue fracture at an early stage to prolong the fatigue life of coupling bellows 150.

Sixth Embodiment

A vacuum circuit breaker according to a sixth embodiment will be described below. The vacuum circuit breaker of the sixth embodiment differs from the vacuum circuit breaker of the fourth embodiment only in the relationship between second elapsed time $t_b$ and the natural frequency of the first bellows to be described later, and thus the description of other configurations will not be repeated.

In the vacuum circuit breaker of the sixth embodiment, first bellows 151 has a natural frequency $f_1$ proportional to the spring constant. The relationship between natural frequency $f_1$ of first bellows 151 and second elapsed time $t_b$ satisfies $t_b \geq 1/f_1$.

The relationship between natural frequency $f_1$ and second elapsed time $t_b$ will be described more specifically. When the axial vibration is generated in first bellows 151 due to the start of the movement of movable shaft 130, first bellows 151 resonates at natural frequency $f_1$, and the vibration reciprocates in first bellows 151 at a period of $1/f_1$. At the start of the braking, the input load having a phase opposite to the input load at the moment when movable shaft 130 starts to move acts on first bellows 151.

Accordingly, when second elapsed time $t_b$ from the start of the movement of movable shaft 130 to the start of the braking coincides with an integer multiple of the period of the axial vibration of first bellows 151, the input load at the start of the braking acts on first bellows 151 so as to cancel the input load at the moment when movable shaft 130 starts to move, and thus the axial vibration of first bellows 151 is prevented. That is, by satisfying a relationship of $t_b=N/f_1$ (N=1, 2, 3, . . . ), the amplitude of the axial vibration of first bellows 151 can be reduced. Distance $d_1$ between pressing member 180 and coupling member 160 is preferably set so as to satisfy the relationship.

In addition, because the amplitude of the axial vibration of first bellows 151 decreases as natural frequency $f_1$ of first bellows 151 increases, when considering that period $1/f_1$ of the axial vibration should be smaller, it can be considered that the amplitude of the axial vibration of first bellows 151 can be prevented by satisfying $t_i>t_b \geq 1/f_1$ for each of first elapsed time $t_i$ and second elapsed time $t_b$.

In the vacuum circuit breaker of the sixth embodiment, because the relationship between natural frequency $f_1$ of first bellows 151 and second elapsed time $t_b$ satisfies $t_b \geq 1/f_1$, the amplitude of the axial vibration of first bellows 151 can be reduced, so that the fatigue life of first bellows 151 can be lengthened.

Seventh Embodiment

A vacuum circuit breaker according to a seventh embodiment will be described below. The vacuum circuit breaker of the seventh embodiment differs from the vacuum circuit breaker of the fourth embodiment only in the relationship between second elapsed time $t_b$ and the natural frequency of the second bellows to be described later, and thus the description of other configurations will not be repeated.

In the vacuum circuit breaker of the seventh embodiment, second bellows 152 has a natural frequency $f_2$ proportional to the spring constant. The relationship between natural frequency $f_2$ of second bellows 152 and second elapsed time $t_b$ satisfies $t_b \geq 1/f_2$.

The relationship between natural frequency $f_2$ and second elapsed time $t_b$ will be described more specifically. When the axial vibration is generated in second bellows 152 due to the start of the movement of movable shaft 130, second bellows 152 resonates at natural frequency $f_2$, and the vibration reciprocates in second bellows 152 at a period of $1/f_2$. At the start of the braking, the input load having a phase opposite to the input load at the moment when movable shaft 130 starts to move acts on second bellows 152 through first bellows 151.

Accordingly, when second elapsed time $t_b$ from the start of the movement of movable shaft 130 to the start of the braking coincides with an integer multiple of the period of the axial vibration of second bellows 152, the input load at the start of the braking acts on second bellows 152 so as to cancel the input load at the moment when movable shaft 130 starts to move, and thus the axial vibration of second bellows 152 is prevented. That is, by satisfying a relationship of $t_b=N/f_2$ (N=1, 2, 3, . . . ), the amplitude of the axial vibration of second bellows 152 can be reduced. Distance $d_1$ between pressing member 180 and coupling member 160 is preferably set so as to satisfy the relationship.

In addition, because the amplitude of the axial vibration of second bellows 152 decreases as natural frequency $f_2$ of second bellows 152 increases, when considering that period $1/f_2$ of the axial vibration should be smaller, it can be considered that the amplitude of the axial vibration of second bellows 152 can be prevented by satisfying $t_i>t_b\geq 1/f_2$ for each of first elapsed time $t_i$ and second elapsed time $t_b$.

In the vacuum circuit breaker of the seventh embodiment, because the relationship between natural frequency $f_2$ of second bellows 152 and second elapsed time $t_b$ satisfies $t_b\geq 1/f_2$, the amplitude of the axial vibration of second bellows 152 can be reduced, so that the fatigue life of second bellows 152 can be lengthened.

Eighth Embodiment

A vacuum circuit breaker according to an eighth embodiment will be described below. The vacuum circuit breaker of the eighth embodiment is different from the vacuum circuit breaker of the fourth embodiment only in the relationship between second elapsed time $t_b$ and the natural frequency of the coupling bellows to be described later, and thus the description of other configurations will not be repeated.

In the vacuum circuit breaker of the eighth embodiment, coupling bellows 150 has a natural frequency $f_t$ proportional to the spring constant. The relationship between natural frequency $f_t$ of coupling bellows 150 and second elapsed time $t_b$ satisfies $t_b\geq 1/f_t$.

The relationship between natural frequency $f_t$ and second elapsed time $t_b$ will be described more specifically. When the axial vibration is generated in coupling bellows 150 due to the start of the movement of movable shaft 130, coupling bellows 150 resonates at natural frequency $f_t$, and the vibration reciprocates in coupling bellows 150 at a period of $1/f_t$. At the start of the braking, the input load having a phase opposite to the input load at the moment when movable shaft 130 starts to move acts on coupling bellows 150.

Accordingly, when second elapsed time $t_b$ from the start of the movement of movable shaft 130 to the start of the braking coincides with an integer multiple of the period of the axial vibration of coupling bellows 150, the input load at the start of the braking acts on coupling bellows 150 so as to cancel the input load at the moment when movable shaft 130 starts to move, and thus the axial vibration of coupling bellows 150 is prevented. That is, by satisfying the relationship of $t_b=N/f_t$ (N=1, 2, 3, . . . ), the amplitude of the axial vibration of coupling bellows 150 can be reduced. Distance $d_1$ between pressing member 180 and coupling member 160 is preferably set so as to satisfy the relationship.

In addition, because the amplitude of the axial vibration of coupling bellows 150 decreases as natural frequency $f_t$ of coupling bellows 150 increases, when considering that period $1/f_t$ of the axial vibration should be smaller, it can be considered that the amplitude of the axial vibration of coupling bellows 150 can be prevented by satisfying $t_i>t_b\geq 1/f_t$ for each of first elapsed time $t_i$ and second elapsed time $t_b$.

In the vacuum circuit breaker of the eighth embodiment, because the relationship between natural frequency $f_t$ of coupling bellows 150 and second elapsed time $t_b$ satisfies $t_b\geq 1/f_t$, the amplitude of the axial vibration of coupling bellows 150 can be reduced, so that the fatigue life of coupling bellows 150 can be lengthened.

Ninth Embodiment

A vacuum circuit breaker according to a ninth embodiment will be described below. The vacuum circuit breaker of the ninth embodiment is different from the vacuum circuit breaker of the second embodiment only in the configurations of the coupling member and the pressing member, and thus the description of other configurations will not be repeated.

Figure 10:
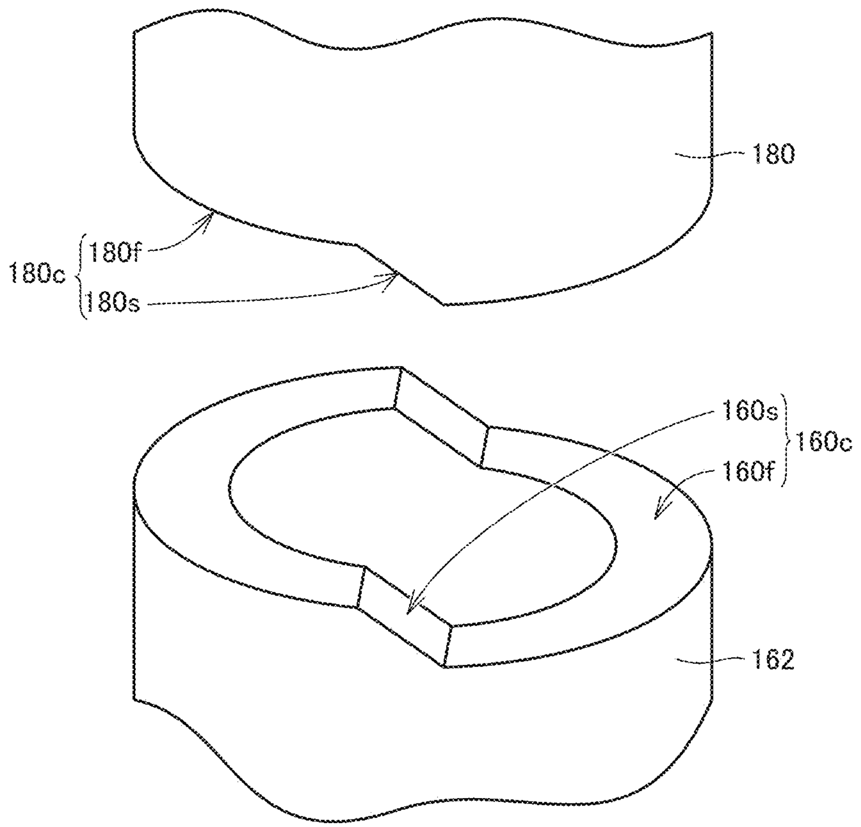
FIG. 10 is an enlarged perspective view illustrating only a part of each of the pressing member and the coupling member in the vacuum circuit breaker according to a ninth embodiment.

FIG. 10 is an enlarged perspective view illustrating only a part of each of the pressing member and the coupling member in the vacuum circuit breaker of the ninth embodiment. As illustrated in FIG. 10, in the vacuum circuit breaker of the ninth embodiment, first surface 160*c* of coupling member 160 includes two first flat surfaces 160*f* perpendicular to the axial direction of movable shaft 130 and two first inclined surfaces 160*s* inclined with respect to two first flat surfaces 160*f*.

Two first inclined surfaces 160*s* are located in parallel on opposite sides in the radial direction of movable shaft 130. Two first flat surfaces 160*f* are located on opposite sides in the radial direction of movable shaft 130. Two first flat surfaces 160*f* are located at different positions in the axial direction of movable shaft 130. Two first flat surfaces 160*f* are connected to each other by two first inclined surfaces 160*s*.

Second surface 180*c* of pressing member 180 includes two second flat surfaces 180*f* perpendicular to the axial direction of movable shaft 130 and two second inclined surfaces 180*s* inclined with respect to two second flat surfaces 180*f*. Two second inclined surfaces 180*s* are formed corresponding to two first inclined surfaces 160*s*. Two second flat surfaces 180*f* are formed corresponding to two first flat surfaces 160*f*.

Specifically, second inclined surface 180*s* is provided at a position in contact with corresponding first inclined surface 160*s* when pressing member 180 moves in the axial direction of movable shaft 130 toward coupling member 160. Second inclined surface 180*s* has a shape capable of sliding contact with first inclined surface 160*s*. An inclination angle of each of first inclined surface 160*s* and second inclined surface 180*s* is not limited to an inclination angle in FIG. 10, but may be any angle as long as the load in the axial direction of movable shaft 130 is dispersed in the direction orthogonal to the axial direction of movable shaft 130.

Figure 11:
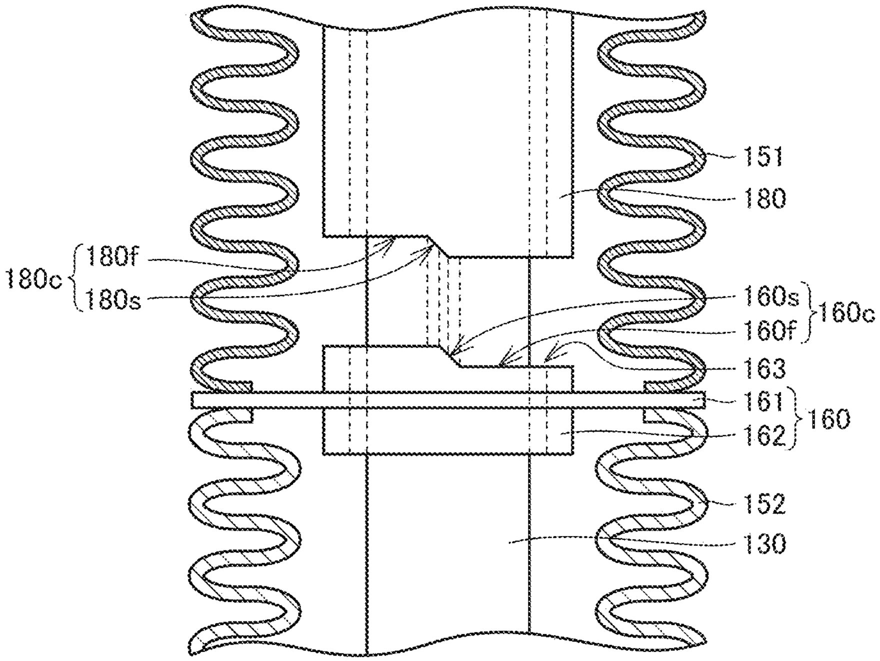
FIG. 11 is a front view illustrating a positional relationship between the pressing member and the coupling member when the vacuum circuit breaker of the ninth embodiment is closed.
Figure 12:
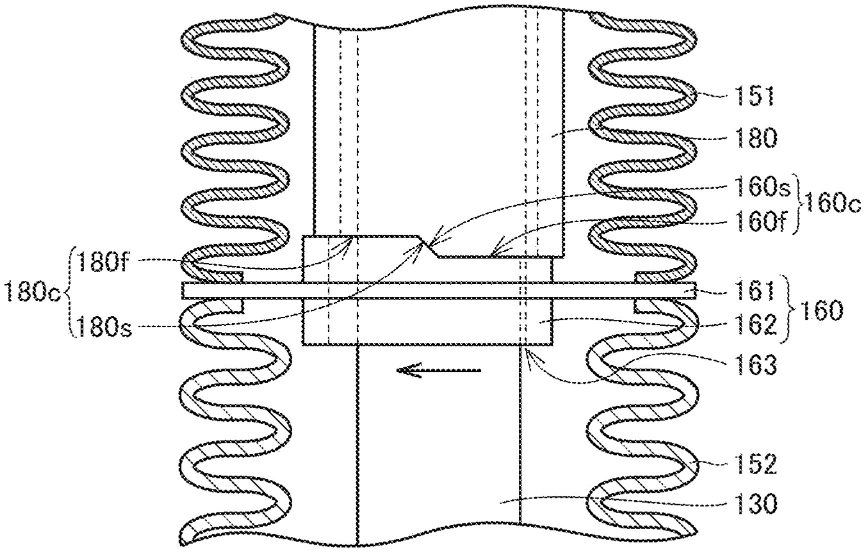
FIG. 12 is a front view illustrating the positional relationship between the pressing member and the coupling member when opening of the vacuum circuit breaker of the ninth embodiment is completed.

FIG. 11 is a front view illustrating a positional relationship between the pressing member and the coupling member when the vacuum circuit breaker of the ninth embodiment is closed. FIG. 12 is a front view illustrating the positional relationship between the pressing member and the coupling member when opening of the vacuum circuit breaker of the ninth embodiment is completed.

As illustrated in FIG. 11, when the vacuum circuit breaker is closed, the positions of first inclined surface 160*s* and second inclined surface 180*s* in the direction orthogonal to the axial direction of movable shaft 130 are shifted from each other, and the positions in the direction orthogonal to the axial direction of movable shaft 130 partially overlap each other. Coupling member 160 is movable in the direction orthogonal to the axial direction of movable shaft 130 by a gap between the inner peripheral surface of hole 163 and the outer peripheral surface of movable shaft 130.

When pressing member 180 moves in the axial direction of movable shaft 130 toward coupling member 160 to presses coupling member 160, second inclined surface 180*s* of pressing member 180 comes into sliding contact with first inclined surface 160*s* of coupling member 160 while abutting on first inclined surface 160*s*.

When first inclined surface 160*s* and second inclined surface 180*s* come into sliding contact with each other, coupling member 160 moves in the direction orthogonal to the axial direction of movable shaft 130 as indicated by an arrow in FIG. 12 while moving in the axial direction of movable shaft 130. After first flat surface 160*f* comes into contact with second flat surface 180*f*, coupling member 160 moves only in the axial direction of movable shaft 130. Coupling bellows 150 is deflected along with the movement of coupling member 160, but this deflection amount is small, so that the deflection hardly affects the fatigue life of the coupling member 160. When pressing member 180 is separated from coupling member 160 along with the axial movement of movable shaft 130, the deflection of coupling bellows 150 is eliminated by the elasticity of coupling bellows 150.

In the vacuum circuit breaker of the ninth embodiment, when pressing member 180 presses coupling member 160, second inclined surface 180*s* of pressing member 180 comes into sliding contact with first inclined surface 160*s* of coupling member 160 while abutting on first inclined surface 160*s*. Therefore, a part of the load during the contact between pressing member 180 and coupling member 160 can be dispersed in the direction orthogonal to the axial direction of movable shaft 130 to reduce the amplitude of the axial vibration of coupling bellows 150, so that the fatigue life of coupling bellows 150 can be lengthened.

Tenth Embodiment

A vacuum circuit breaker according to a tenth embodiment will be described below. The vacuum circuit breaker of the tenth embodiment is different from the vacuum circuit breaker of the ninth embodiment only in the configurations of the coupling member and the pressing member, and thus the description of other configurations will not be repeated.

Figure 13:
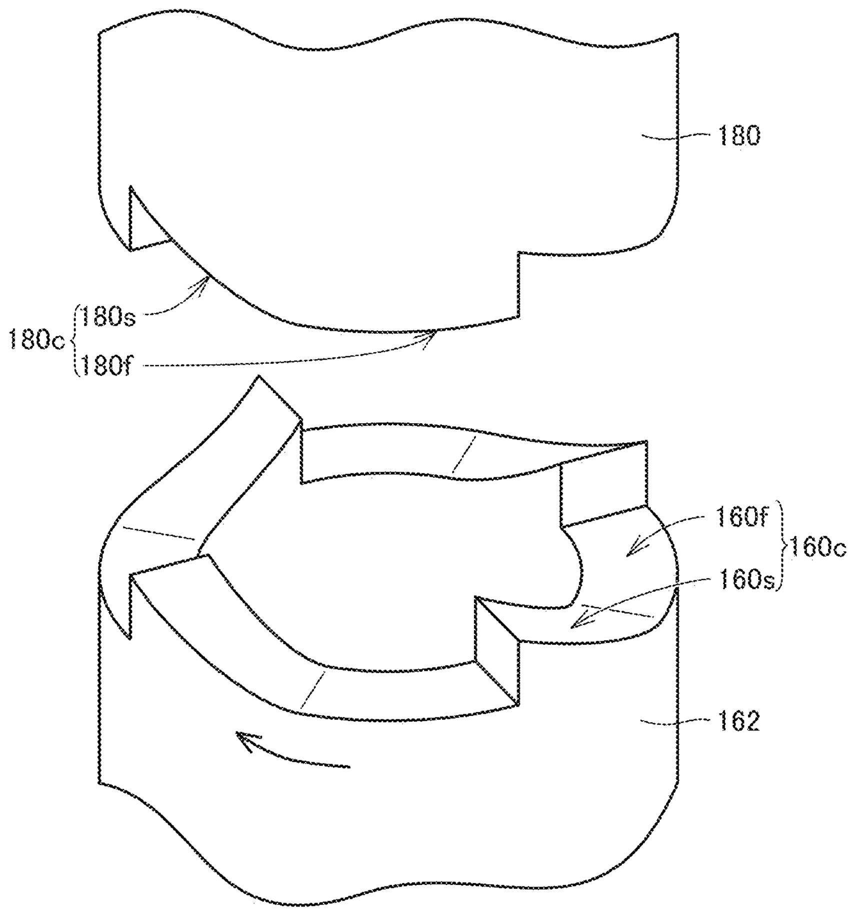
FIG. 13 is an enlarged perspective view illustrating only a part of each of the pressing member and the coupling member in the vacuum circuit breaker according to a tenth embodiment.

FIG. 13 is an enlarged perspective view illustrating only a part of each of the pressing member and the coupling member in the vacuum circuit breaker of the tenth embodiment. As illustrated in FIG. 13, in the vacuum circuit breaker of the tenth embodiment, first surface 160*c* includes four first flat surfaces 160*f* perpendicular to the axial direction of movable shaft 130 and four first inclined surfaces 160*s* inclined with respect to four first flat surfaces 160*f*.

In the circumferential direction of movable shaft 130, first inclined surface 160*s* and first flat surface 160*f* are alternately located. First surface 160*c* is four-time rotationally symmetric about the axis of movable shaft 130.

Second surface 180*c* of pressing member 180 includes four second flat surfaces 180*f* perpendicular to the axial direction of movable shaft 130 and four second inclined surfaces 180*s* inclined with respect to four second flat surfaces 180*f*. Four second inclined surfaces 180*s* are formed corresponding to four first inclined surfaces 160*s*. Four second flat surfaces 180*f* are formed corresponding to four first flat surfaces 160*f*.

Specifically, second inclined surface 180*s* is provided at a position in contact with corresponding first inclined surface 160*s* when pressing member 180 moves in the axial direction of movable shaft 130 toward coupling member 160. Second inclined surface 180*s* has a shape capable of sliding contact with first inclined surface 160*s*. The inclination angle of each of first inclined surface 160*s* and second inclined surface 180*s* is not limited to the inclination angle in FIG. 13, but may be any angle as long as the load in the axial direction of movable shaft 130 is dispersed in the circumferential direction of movable shaft 130.

When the vacuum circuit breaker is closed, the phases of first inclined surface 160*s* and second inclined surface 180*s* in the circumferential direction of movable shaft 130 are shifted from each other, and the positions in the circumferential direction of movable shaft 130 partially overlap each other. Coupling member 160 is movable in the circumferential direction of movable shaft 130.

When pressing member 180 moves in the axial direction of movable shaft 130 toward coupling member 160 to presses coupling member 160, second inclined surface 180*s* of pressing member 180 comes into sliding contact with first inclined surface 160*s* of coupling member 160 while abutting on first inclined surface 160*s*.

When first inclined surface 160*s* and second inclined surface 180*s* come into sliding contact with each other, coupling member 160 moves in the circumferential direction of movable shaft 130 as indicated by an arrow in FIG. 13 while moving in the axial direction of movable shaft 130. After first flat surface 160*f* comes into contact with second flat surface 180*f*, coupling member 160 moves only in the axial direction of movable shaft 130. Coupling bellows 150 is twisted along with the movement of coupling member 160, but this twist amount is small, so that the twist hardly affects the fatigue life of the coupling member 160. When pressing member 180 is separated from coupling member 160 along with the axial movement of movable shaft 130, the twist of coupling bellows 150 is eliminated by the elasticity of coupling bellows 150.

In the vacuum circuit breaker of the tenth embodiment, when pressing member 180 presses coupling member 160, second inclined surface 180*s* of pressing member 180 comes into sliding contact with first inclined surface 160*s* of coupling member 160 while abutting on first inclined surface 160*s*. Therefore, a part of the load during the contact between pressing member 180 and coupling member 160 can be dispersed in the circumferential direction of movable shaft 130 to reduce the amplitude of the axial vibration of coupling bellows 150, so that the fatigue life of coupling bellows 150 can be lengthened.

Eleventh Embodiment

A vacuum circuit breaker according to an eleventh embodiment will be described below. The vacuum circuit breaker of the eleventh embodiment is different from vacuum circuit breaker of the second embodiment only in the configurations of the coupling bellows, the coupling member, and the pressing member, and thus the description of other configurations will not be repeated.

Figure 14:
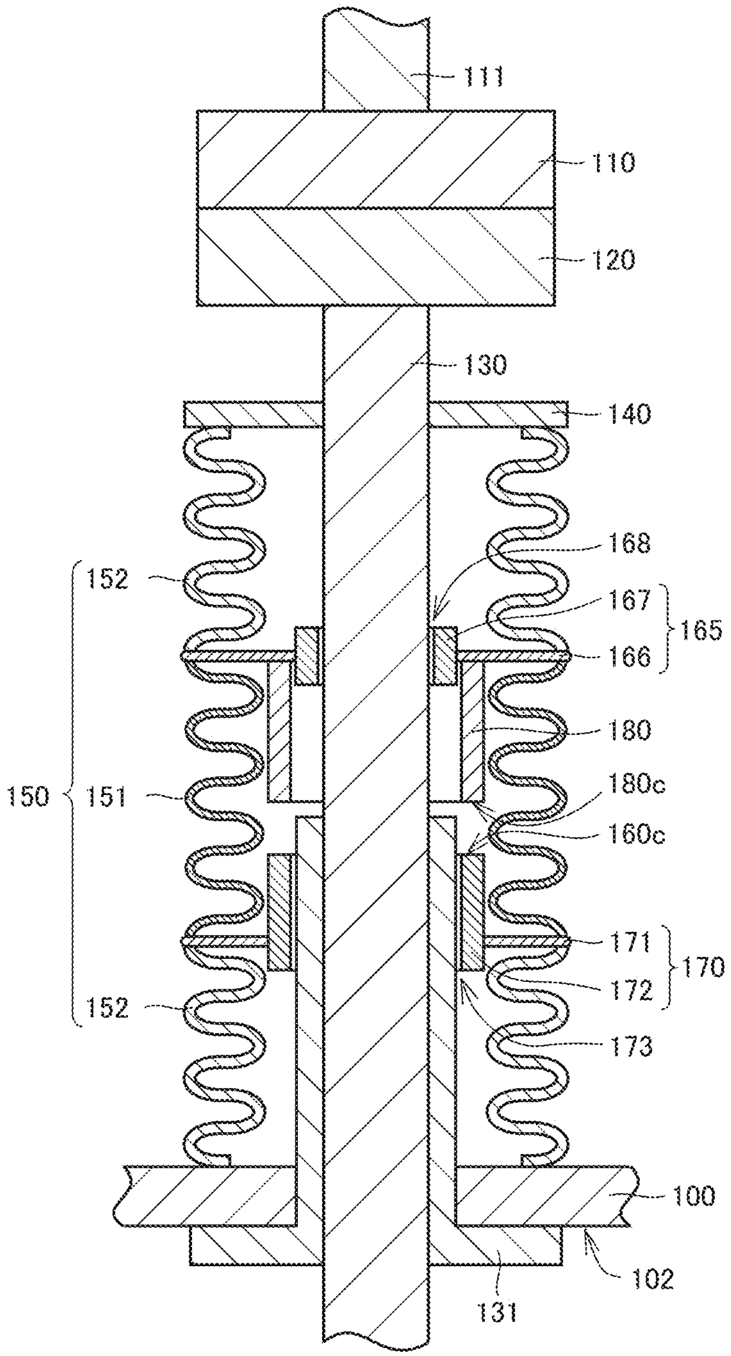
FIG. 14 is a longitudinal sectional view illustrating a configuration of a vacuum circuit breaker according to an eleventh embodiment.

FIG. 14 is a longitudinal sectional view illustrating the configuration of the vacuum circuit breaker of the eleventh embodiment. As illustrated in FIG. 14, in the vacuum circuit breaker of the eleventh embodiment, coupling bellows 150 includes two or more of at least one of first bellows 151 and second bellows 152.

Specifically, in the eleventh embodiment, coupling bellows 150 includes one first bellows 151 and two second bellows 152. Second bellows 152 is connected to both ends of first bellows 151. At least one of both the ends of first bellows 151 may be connected to second bellows 152.

In the eleventh embodiment, an upper coupling member 165 and a lower coupling member 170 are arranged side by side in the axial direction of movable shaft 130 as the coupling member. Upper coupling member 165 is located above lower coupling member 170.

Upper coupling member 165 includes a coupling unit 166 and a sliding contact unit 167. Sliding contact unit 167 is in sliding contact with the outer peripheral surface of movable shaft 130. Upper coupling member 165 includes a hole 168 inserted with movable shaft 130 so as to be movable in the axial direction of movable shaft 130.

Lower coupling member 170 includes a coupling unit 171 and a sliding contact unit 172. Sliding contact unit 172 is in sliding contact with the outer peripheral surface of guide member 131. Lower coupling member 170 includes a hole 173 inserted with the movable shaft 130 so as to be movable in the axial direction of movable shaft 130. In the eleventh embodiment, first surface **160*c* is an upper surface of sliding contact unit 172**.

Pressing member 180 extends downward from the lower surface of coupling unit 166. An upper end of pressing member 180 is connected to coupling unit 166. Pressing member 180 is located above sliding contact unit 172. In the eleventh embodiment, second surface **180*c* of pressing member 180 comes into contact with sliding contact unit 172**.

Pressing member 180 moves in the axial direction of movable shaft 130 toward lower coupling member 170 along with the movement of movable shaft 130 in the direction in which movable contactor 120 is separated from fixed contactor 110, and first bellows 151 preferentially contracts from the start of the opening of the vacuum circuit breaker until pressing member 180 and lower coupling member 170 come into contact with each other. When first bellows 151 contracts and when second surface **180*c* of pressing member 180 comes into contact with first surface 160*c* of lower coupling member 170, the contraction of first bellows 151 stops. After pressing member 180 and lower coupling member 170 come into contact with each other, only two second bellows 152** contract until the opening of the vacuum circuit breaker is completed.

Pressing member 180 may be provided on the upper surface of coupling unit 171 of lower coupling member 170, and the vacuum circuit breaker may be configured such that coupling unit 166 of upper coupling member 165 and pressing member 180 come into contact with each other. In addition, each of coupling unit 166 and coupling unit 171 may also protrude to the outer peripheral side of each of first bellows 151 and second bellows 152, and pressing member 180 may be disposed on the outer peripheral side of first bellows 151.

When the vacuum circuit breaker of the eleventh embodiment includes two or more of at least one of first bellows 151 and second bellows 152, even in the case where opening stroke d is long, the maximum load of coupling bellows 150 can be decreased to lengthen the fatigue life of coupling bellows 150 by making the load distribution in coupling bellows 150 uniform while the amplitude of the axial vibration of coupling bellows 150 is decreased.

Twelfth Embodiment

A vacuum circuit breaker according to a twelfth embodiment will be described below. The vacuum circuit breaker of the twelfth embodiment is different from vacuum circuit breaker of the eleventh embodiment only in the configurations of the coupling bellows, the coupling member, and the pressing member, and thus the description of other configurations will not be repeated.

Figure 15:
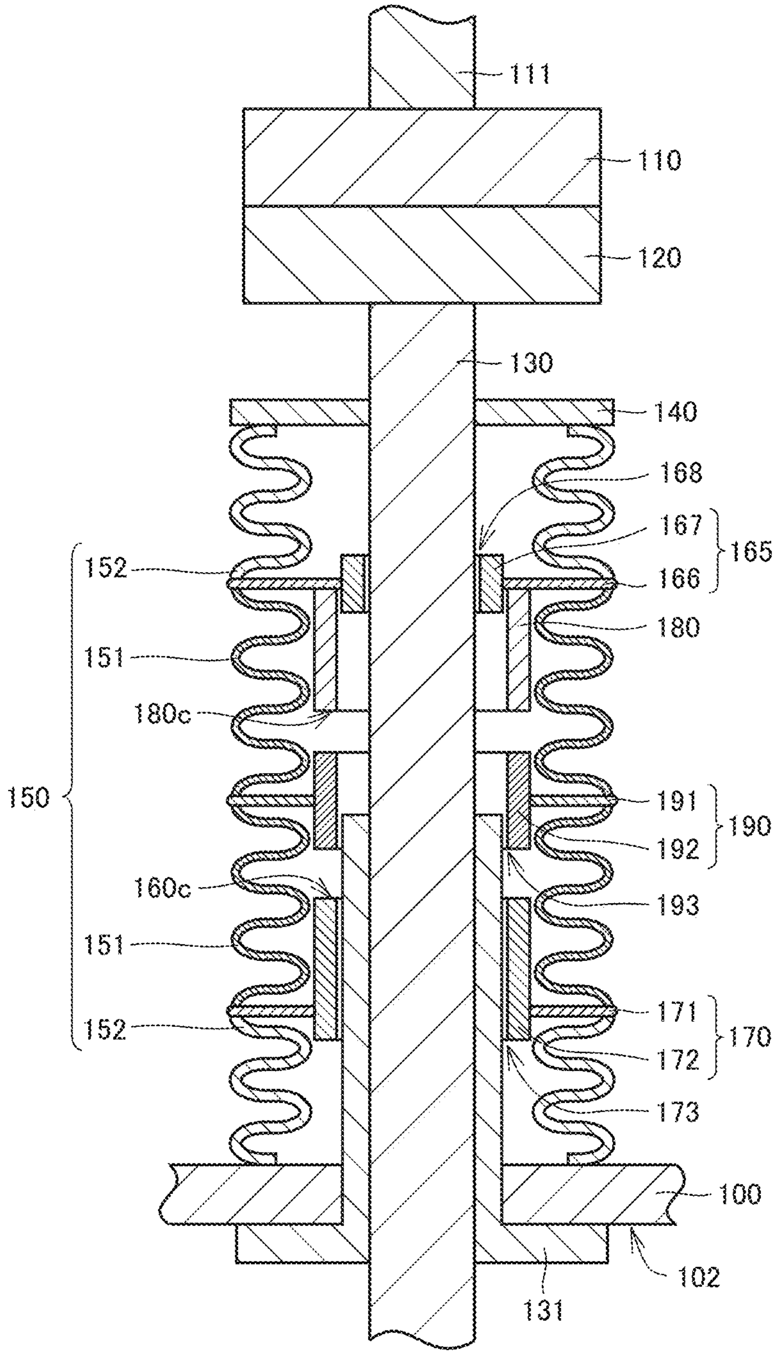
FIG. 15 is a longitudinal sectional view illustrating a configuration of a vacuum circuit breaker according to a twelfth embodiment.

FIG. 15 is a longitudinal sectional view illustrating the configuration of the vacuum circuit breaker of the twelfth embodiment. As illustrated in FIG. 15, in the vacuum circuit breaker of the twelfth embodiment, coupling bellows 150 includes two or more of at least one of first bellows 151 and second bellows 152.

Specifically, in the twelfth embodiment, coupling bellows 150 includes two first bellows 151 and two second bellows 152. Two first bellows 151 are connected to each other. Two second bellows 152 are disposed so as to sandwich two first bellows 151 therebetween. It is sufficient that at least one of both ends of first bellows 151 is connected to second bellows 152, and the number of combinations of first bellows 151 and second bellows 152 is not limited to two each.

In the twelfth embodiment, an extension coupling member 190 is disposed between upper coupling member 165 and lower coupling member 170. Two first bellows 151 are connected to each other by extension coupling member 190.

Extension coupling member 190 includes a coupling unit 191 extending in the radial direction of movable shaft 130 so as to protrude to at least one of the inner peripheral side and the outer peripheral side of each of two first bellows 151. Coupling unit 191 is joined to each of two first bellows 151 adjacent to each other. In the twelfth embodiment, coupling unit 191 extends in the radial direction of movable shaft 130 so as to protrude to both the inner peripheral side and the outer peripheral side of each of two first bellows 151. Coupling unit 191 has an annular shape.

Extension coupling member 190 includes a hole 193 inserted with movable shaft 130 so as to be movable in the axial direction of movable shaft 130. In the twelfth embodiment, extension coupling member 190 includes an annular sliding contact unit 192 in sliding contact with the outer peripheral surface of guide member 131 in order to prevent coupling bellows 150 from buckling due to the pressure inside coupling bellows 150. Hole 193 is located inside sliding contact unit 192. Coupling unit 191 is connected to the outer peripheral surface of sliding contact unit 192.

Pressing member 180 moves in the axial direction of movable shaft 130 toward lower coupling member 170 along with the movement of movable shaft 130 in the direction in which movable contactor 120 is separated from fixed contactor 110, and first bellows 151 preferentially contracts from the start of the opening of the vacuum circuit breaker until pressing member 180 and lower coupling member 170 come into contact with each other through extension coupling member 190. When first bellows 151 contracts and when second surface **180*c* of pressing member 180 comes into contact with first surface 160*c* of lower coupling member 170 through sliding contact unit 192 of extension coupling member 190, the contraction of first bellows 151 stops. After pressing member 180 and lower coupling member 170 come into contact with each other through extension coupling member 190, only two second bellows 152** contract until the opening of the vacuum circuit breaker is completed.

When the vacuum circuit breaker of the twelfth embodiment includes two or more of at least one of first bellows 151 and second bellows 152, even when opening stroke d is long, the maximum load of coupling bellows 150 can be decreased to lengthen the fatigue life of coupling bellows 150 by making the load distribution in coupling bellows 150 uniform while the amplitude of the axial vibration of coupling bellows 150 is decreased.

It should be noted that the above embodiments disclosed herein is merely an example in all respects, and are not a basis for restrictive interpretation. Accordingly, the technical scope of the present disclosure is not to be construed only by the above-described embodiments. Furthermore, the meaning equivalent to the claims and all changes within the claims are included. In the description of the above-described embodiments, configurations that can be combined may be combined with each other.

REFERENCE SIGNS LIST

1: vacuum circuit breaker, 100: container, 101: top surface, 102: bottom surface, 110: fixed contactor, 111: fixed shaft, 120: movable contactor, 130: movable shaft, 131: guide member, 140: plate-shaped member, 150: coupling bellows, 151: first bellows, 151*b*, 152*b*: lower end, 151*t*, 152*t*: upper end, 152: second bellows, 160: coupling member, 160*c*: first surface, 160*f*: first flat surface, 160*s*: first inclined surface, 161, 166, 171, 191: coupling unit, 162, 167, 172, 192: sliding contact unit, 163, 168, 173, 193: hole, 165: upper coupling member, 170: lower coupling member, 180: pressing member, 180*c*: second surface, 180*f*: second flat surface, 180*s*: second inclined surface, 190: extension coupling member, d: opening stroke, $d_1$: distance between pressing member and coupling member during closing, $f_1$, $f_2$, $f_t$: natural frequency, $t_b$: second elapsed time, $t_i$: first elapsed time

The invention claimed is:

1. A vacuum circuit breaker comprising:

a fixed contactor;

a movable contactor contactable with and separable from the fixed contactor;

a container accommodating each of the fixed contactor and the movable contactor and holding an inside thereof in vacuum;

a movable shaft extending in an axial direction from an outside of the container and connected to the movable contactor to drive the movable contactor by moving in the axial direction;

a plate-shaped member attached to the movable shaft inside the container and extending around an axis of the movable shaft;

a coupling bellows including a first bellows expandable and contractible in the axial direction and a second bellows positioned side by side with the first bellows in the axial direction and expandable and contractible in the axial direction, and having a spring constant higher than a spring constant of the first bellows, and airtightly connecting the plate-shaped member and an inner surface of the container on an outer side of the movable shaft;

a coupling member extending in a radial direction of the movable shaft so as to protrude to at least one of an inner peripheral side and an outer peripheral side of each of the first bellows and the second bellows, joined to each of the first bellows and the second bellows adjacent to each other, and including a hole inserted with the movable shaft so as to be movable in the axial direction; and a pressing member disposed on the inner peripheral side or the outer peripheral side of the first bellows, to move in the axial direction toward the coupling member along with movement of the movable shaft in a direction in which the movable contactor is separated from the fixed contactor, to come into contact with the coupling member and thereafter press the coupling member, thereby contracting the second bellows, wherein when the first bellows contracts and after the pressing member and the coupling member come into contact with each other, the first bellows does not contract, and the second bellows contracts until the opening of the vacuum circuit breaker is completed.

2. The vacuum circuit breaker according to claim 1, wherein each of the first bellows and the second bellows includes a crest and a valley alternately arranged in the axial direction, and a deformation amount in the axial direction per pitch between the crests adjacent to each other in the axial direction is smaller in the second bellows than in the first bellows.

3. The vacuum circuit breaker according to claim 2, comprising two or more of at least one of the first bellows and the second bellows.

4. The vacuum circuit breaker according to claim 1, wherein the coupling member includes a first surface that comes into contact with the pressing member, the pressing member includes a second surface that comes into contact with the coupling member, the first surface includes a first inclined surface inclined with respect to a plane perpendicular to the axial direction, the second surface includes a second inclined surface inclined with respect to a plane perpendicular to the axial direction, and when the pressing member presses the coupling member, the second inclined surface of the pressing member comes into sliding contact with the first inclined surface of the coupling member while abutting on the first inclined surface.

5. The vacuum circuit breaker according to claim 4, comprising two or more of at least one of the first bellows and the second bellows.

6. The vacuum circuit breaker according to claim 1, comprising two or more of at least one of the first bellows and the second bellows.

7. The vacuum circuit breaker according to claim 1, wherein the first bellows contracts preferentially over the second bellows from the start of the opening of the vacuum circuit breaker until the pressing member and the coupling member come into contact with each other.

8. A vacuum circuit breaker comprising:

a fixed contactor;

a movable contactor contactable with and separable from the fixed contactor:

a container accommodating each of the fixed contactor and the movable contactor and holding an inside thereof in vacuum;

a movable shaft extending in an axial direction from an outside of the container and connected to the movable contactor to drive the movable contactor by moving in the axial direction;

a plate-shaped member attached to the movable shaft inside the container and extending around an axis of the movable shaft;

a coupling bellows including a first bellows expandable and contractible in the axial direction and a second bellows positioned side by side with the first bellows in the axial direction and expandable and contractible in the axial direction, and having a spring constant higher than a spring constant of the first bellows, and airtightly connecting the plate-shaped member and an inner surface of the container on an outer side of the movable shaft;

a coupling member extending in a radial direction of the movable shaft so as to protrude to at least one of an inner peripheral side and an outer peripheral side of each of the first bellows and the second bellows, joined to each of the first bellows and the second bellows adjacent to each other, and including a hole inserted with the movable shaft so as to be movable in the axial direction; and a pressing member disposed on the inner peripheral side or the outer peripheral side of the first bellows, to move in the axial direction toward the coupling member along with movement of the movable shaft in a direction in which the movable contactor is separated from the fixed contactor, to come into contact with the coupling member and thereafter press the coupling member, thereby contracting the second bellows, wherein a first elapsed time ti from a start of the movement of the movable shaft to a start of pressing of the pressing member with respect to the coupling member is longer than a second elapsed time to from the start of the movement of the movable shaft to the start of the braking.

9. The vacuum circuit breaker according to claim 8, wherein the first bellows has a natural frequency $f_1$, and a relationship between the natural frequency $f_1$ and the second elapsed time $t_b$ satisfies $t_b \geq 1/f_1$.

10. The vacuum circuit breaker according to claim 9, wherein the second bellows has a natural frequency $f_2$, and a relationship between the natural frequency $f_2$ and the second elapsed time $t_b$ satisfies $t_b \geq 1/f_2$.

11. The vacuum circuit breaker according to claim 10, wherein the coupling bellows has a natural frequency $f_t$, and a relationship between the natural frequency $f_t$ and the second elapsed time $t_b$ satisfies $t_b \geq 1/f_t$.

12. The vacuum circuit breaker according to claim 11, comprising two or more of at least one of the first bellows and the second bellows.

13. The vacuum circuit breaker according to claim 9, comprising two or more of at least one of the first bellows and the second bellows.

14. The vacuum circuit breaker according to claim 10, comprising two or more of at least one of the first bellows and the second bellows.

15. The vacuum circuit breaker according to claim 8, comprising two or more of at least one of the first bellows and the second bellows.

* * * * *